United States Patent
Komiya (10) Patent No.: US 9,420,195 B2
(45) Date of Patent: Aug. 16, 2016

(54) IMAGING APPARATUS, IMAGING METHOD AND RECORDING MEDIUM

(71) Applicant: CASIO COMPUTER CO., LTD., Shibuya-ku, Tokyo (JP)

(72) Inventor: Rie Komiya, Akishima (JP)

(73) Assignee: CASIO COMPUTER CO., LTD., Tokyo (JP)

(*) Notice: Subject to any disclaimer, the term of this patent is extended or adjusted under 35 U.S.C. 154(b) by 36 days.

(21) Appl. No.: 14/486,691

(22) Filed: Sep. 15, 2014

(65) Prior Publication Data

US 2015/0086176 A1    Mar. 26, 2015

(30) Foreign Application Priority Data

Sep. 20, 2013    (JP) .................................. 2013-195315

(51) Int. Cl.
 *H04N 5/235* (2006.01)
 *H04N 5/262* (2006.01)
 *H04N 5/232* (2006.01)

(52) U.S. Cl.
 CPC ........... *H04N 5/2353* (2013.01); *H04N 5/2352* (2013.01); *H04N 5/23245* (2013.01); *H04N 5/2621* (2013.01)

(58) Field of Classification Search
 CPC ..... H04N 5/765; H04N 5/772; H04N 5/2353; H04N 5/2621; H04N 5/23245; H04N 5/2352
 USPC .......... 386/226, 227; 348/148, 207.99, 221.1, 348/231.6
 See application file for complete search history.

(56) References Cited

U.S. PATENT DOCUMENTS

| 7,202,902 B2* | 4/2007 | Miura | H04N 5/2354 348/362 |
| 2004/0027467 A1* | 2/2004 | Shiga | H04N 5/2252 348/231.99 |
| 2006/0205502 A1* | 9/2006 | Kaneshige | A63F 13/10 463/33 |

FOREIGN PATENT DOCUMENTS

| JP | 2004336153 A | 11/2004 |
| JP | 2005176246 A | 6/2005 |
| JP | 2007288801 A | 11/2007 |
| JP | 2010016599 A | 1/2010 |
| JP | 2012032709 A | 2/2012 |

OTHER PUBLICATIONS

Korean Office Action (and English translation thereof) dated Aug. 17, 2015, issued in counterpart Korean Application No. 10-2014-0124809.
Japanese Office Action (and English translation thereof) dated Jul. 28, 2015, issued in counterpart Japanese Application No. 2013-195315.

* cited by examiner

*Primary Examiner* — Thai Tran
*Assistant Examiner* — Mishawn Hunter
(74) *Attorney, Agent, or Firm* — Holtz, Holtz & Volek PC (57) ABSTRACT

An imaging apparatus includes: an imaging member; a specifying member to specify a change in an imaging environment when the imaging member performs imaging; a setting member to perform setting to determine whether an exposure condition is to be fixed or to be subjected to tracking, depending on the change in the imaging environment specified by the specifying member; and a control member to control the imaging member to image a still image according to a content set by the setting member, at a regular interval, during a predetermined time period.

11 Claims, 5 Drawing Sheets

FIG.2

| IMAGING SCENE | INTERVAL TIME | TOTAL TIME | FOCUS POSITION | WHITE BALANCE |
|---|---|---|---|---|
| STANDARD | 0.5 SECONDS | 5 MINUTES | MEASURE IT AT THE TIME OF IMAGING THE FIRST IMAGE AND FIX IT AT MEASURED RESULT | TRACKING |
| CLOUDS | 5 SECONDS | 30 MINUTES | FIX IT AT INFINITY | MEASURE IT AT THE TIME OF IMAGING THE FIRST IMAGE AND FIX IT AT MEASURED RESULT |
| NIGHT SCENE | 3 SECONDS | 30 MINUTES | MEASURE IT AT THE TIME OF IMAGING THE FIRST IMAGE AND FIX IT AT MEASURED RESULT | TRACKING |
| SUNDOWN | 10 SECONDS | 60 MINUTES | FIX IT AT INFINITY | TRACKING |
| TRAINS & PLANES | 1 SECOND | 20 MINUTES | MEASURE IT AT THE TIME OF IMAGING THE FIRST IMAGE AND FIX IT AT MEASURED RESULT | TRACKING |
| CITYSCAPE | 0.5 SECONDS | 5 MINUTES | MEASURE IT AT THE TIME OF IMAGING THE FIRST IMAGE AND FIX IT AT MEASURED RESULT | TRACKING |
| ... | ... | ... | ... | ... |

IMAGING APPARATUS, IMAGING METHOD AND RECORDING MEDIUM

CROSS-REFERENCE TO RELATED APPLICATIONS

This application is based upon and claims the benefit of priority from the prior Japanese Patent Application No. 2013-195315 filed on Sep. 20, 2013, the entire contents of which are incorporated herein by reference.

BACKGROUND OF THE INVENTION

1. Field of the Invention

The present invention relates to an imaging apparatus, an imaging method and a recording medium.

2. Description of the Related Art

Heretofore, there has been known a technique to create a time-lapse moving image including, as frame images, still images which have been imaged intermittently at predetermined time intervals, as described in Japanese Patent Application Laid-Open Publication No. 2010-16599.

By fixing imaging conditions such as Auto Focus (AF), Automatic Exposure (AE), and Automatic White Balance (AWB) at the time of imaging the still images for the time-lapse moving image, screen flickers can be prevented when the time-lapse moving image is reproduced.

SUMMARY OF THE INVENTION

According to the first aspect of the present invention, there is provided an imaging apparatus including: an imaging member; a specifying member to specify a change in an imaging environment when the imaging member performs imaging; a setting member to perform setting to determine whether an exposure condition is to be fixed or to be subjected to tracking, depending on the change in the imaging environment specified by the specifying member; and a control member to control the imaging member to image a still image according to a content set by the setting member, at a regular interval, during a predetermined time period.

According to the second aspect of the present invention, there is provided an imaging method including: a specifying step to specify a change in an imaging environment when imaging is performed; a setting step to perform setting to determine whether an exposure condition is to be fixed or to be subjected to tracking, depending on the change in the imaging environment specified in the specifying step; and a control step to perform controlling so that a still image is imaged according to a content set in the setting step, at a regular interval, during a predetermined time period.

According to the third aspect of the present invention, there is provided a computer readable recording medium recording a program for causing a computer of an imaging apparatus to functions as: a specifying member to specify a change in an imaging environment when imaging is performed; a setting member to perform setting to determine whether an exposure condition is to be fixed or to be subjected to tracking, depending on the change in the imaging environment specified by the specifying member; and a control member to perform controlling so that a still image is imaged according to a content set by the setting member, at a regular interval, during a predetermined time period.

BRIEF DESCRIPTION OF THE SEVERAL VIEWS OF THE DRAWINGS

The above and further objects, features and advantages of the present invention will be made clearer by the following detailed description and the attached drawings, in which.

DETAILED DESCRIPTION OF THE PREFERRED EMBODIMENTS

Hereinafter specific modes of the present invention will be described with reference to the drawings. In this regard, however, the scope of the invention is not limited to the illustrated examples.

[First Embodiment]

Figure 1:
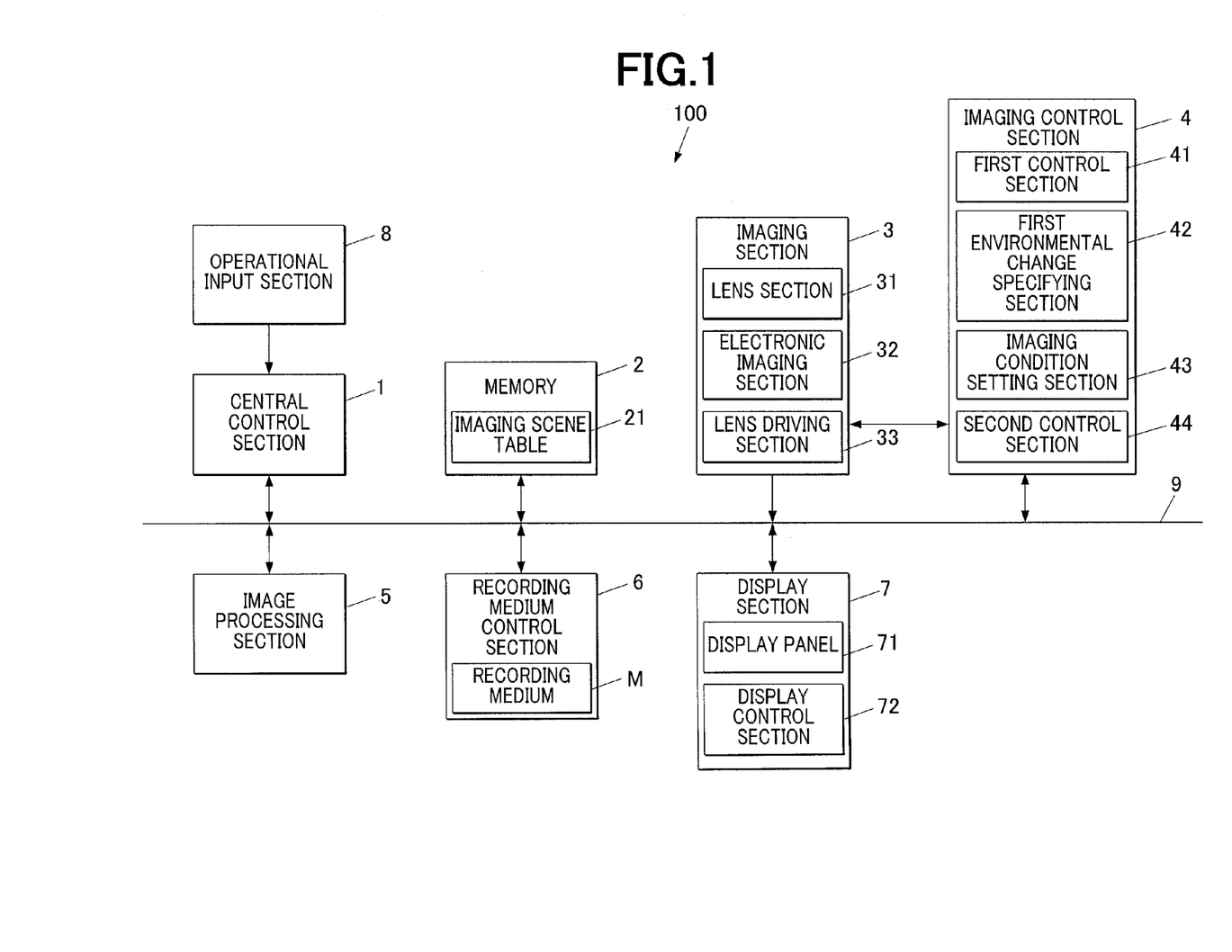
FIG. 1 is a block diagram illustrating a schematic configuration of an imaging apparatus according to a first embodiment to which the present invention is applied.

FIG. 1 is a block diagram illustrating a schematic configuration of an imaging apparatus 100 according to a first embodiment to which the present invention is applied.

Specifically, as illustrated in FIG. 1, the imaging apparatus 100 of this embodiment includes a central control section 1, a memory 2, an imaging section 3, an imaging control section 4, an image processing section 5, a recording medium control section 6, a display section 7 and an operational input section 8.

The central control section 1, memory 2, imaging section 3, imaging control section 4, image processing section 5, recording medium control section 6 and display section 7 are connected to one another via a bus line 9.

The central control section 1 controls the respective sections of the imaging apparatus 100. Specifically, though illustration is omitted, the central control section 1 is equipped with a Central Processing Unit (CPU), etc., and performs various kinds of control operations according to various processing programs (not illustrated) used for the imaging apparatus 100.

The memory 2 is composed of, for example, a Dynamic Random Access Memory (DRAM), etc., and temporarily stores data to be processed by the central control section 1, the imaging section 3, the imaging control section 4, the image processing section 5, and so on.

The memory 2 also records an imaging scene table 21 (see FIG. 2) in which various imaging conditions are defined for each imaging scene at the time of imaging a time-lapse moving image.

Figure 2:
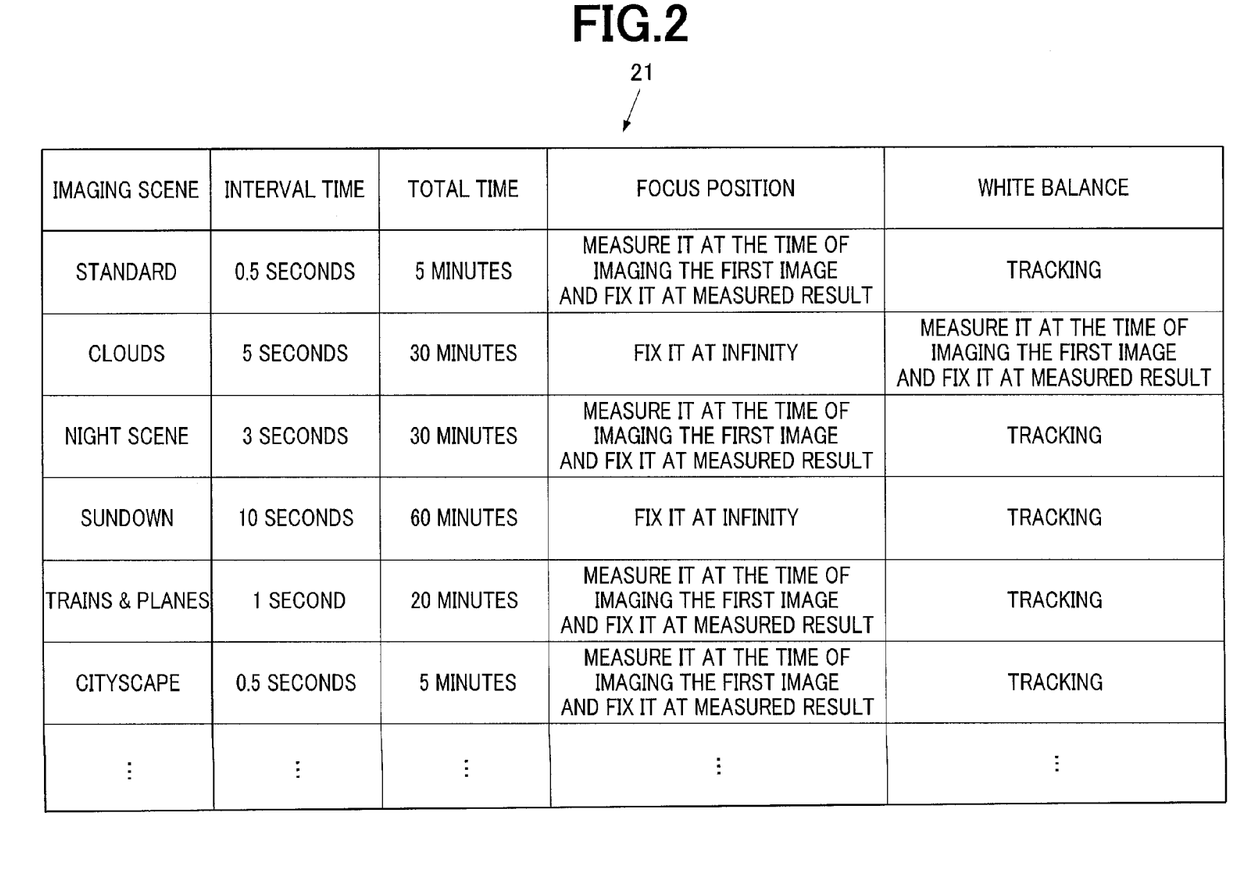
FIG. 2 is a diagram illustrating an example of an imaging scene table relating to an imaging process by the imaging apparatus illustrated in FIG. 1.

As illustrated in FIG. 2, in the imaging scene table 21, an interval time, a total time, a content of focus position and a content of white balance are correlated to one another per each imaging scene.

Specifically, for example, there may be adopted, as the imaging scenes, "Standard" as a mode for a standard imaging of the time-lapse moving image, "Clouds" as a mode for imaging clouds as an object, "Night Scene" as a mode for imaging a night scene as an object, "Sundown" as a mode for imaging a sundown/twilight as an object, "Trains & Planes" as a mode for imaging a conveyance(s) such as a train and a plane as an object, "Cityscape" as a mode for imaging a cityscape as an object, and so on.

To the imaging scene "Standard", the interval time "0.5 seconds", the total time "5 minutes", the content of focus position "Measure it at the time of imaging the first image and fix it at measured result", and the content of white balance "Tracking" are correlated. "Tracking" means to grasp an imaging environment at a certain imaging timing and change the imaging condition depending on the imaging environment as necessary.

To the imaging scene "Clouds", the interval time "5 minutes", the total time "30 minutes", the content of focus position "Fix it at infinity", and the content of white balance "Measure it at the time of imaging the first image and fix it at measured result" are correlated.

To the imaging scene "Night Scene", the interval time "3 seconds", the total time "30 minutes", the content of focus position "Measure it at the time of imaging the first image and fix it at measured result", and the content of white balance "Tracking" are correlated.

To the imaging scene "Sundown", the interval time "10 seconds", the total time "60 minutes", the content of focus position "Fix it at infinity", and the content of white balance "Tracking" are correlated.

To the imaging scene "Trains & Planes", the interval time "1 second", the total time "20 minutes", the content of focus position "Measure it at the time of imaging the first image and fix it at measured result", and the content of white balance "Tracking" are correlated.

To the imaging scene "Cityscape", the interval time "0.5 seconds", the total time "5 minutes", the content of focus position "Measure it at the time of imaging the first image and fix it at measured result", and the content of white balance "Tracking" are correlated.

Incidentally, the content of the imaging scene table 21 is a mere example, and the present invention is not limited thereto. The content of the imaging scene table 21 may be appropriately changed as someone thinks proper.

The imaging section (imaging member) 3 images a predetermined object (e.g. a person, etc.) to generate a frame image(s).

Specifically, the imaging section 3 is equipped with a lens section 31, an electronic imaging section 32, and a lens driving section 33.

The lens section 31 is composed of a plurality of lenses such as a zoom lens and a focus lens.

The electronic imaging section 32 is composed of, for example, an image sensor such as a Charge Coupled Device (CCD) and a Complementary Metal-oxide Semiconductor (CMOS). The electronic imaging section 32 converts an optical image, which has passed through various lenses of the lens section 31, into a two-dimensional image signal.

The lens driving section 33 is equipped with, for example, a zoom driving section which makes the zoom lens move in an optical axis direction, and a focusing driving section which makes the focus lens move in the optical axis direction, and so on, though illustration is omitted.

Incidentally, the imaging section 3 may include, in addition to the lens section 31, the electronic imaging section 32 and the lens driving section 33, a diaphragm (not illustrated) which adjusts an amount of light that passes through the lens section 31.

The imaging control section 4 controls imaging of an object by the imaging section 3.

Concretely, though illustration is omitted, the imaging control section 4 is equipped with a timing generator, a driver, and so on. The imaging control section 4 causes the timing generator and the driver to drive the electronic imaging section 32 to perform scanning, and causes the electronic imaging section 32 to convert the optical image, which has passed through the lens section 31, into the two-dimensional image signal in each predetermined period, so that the frame image for one screen is read out at a time from an imaging region of the electronic imaging section 32 to be output to the image processing section 5.

The imaging control section 4 may also perform adjustment controls of conditions for object imaging, such as Auto Focus (AF), Automatic Exposure (AE), and Automatic White Balance (AWB). Specifically, the imaging control section 4 is equipped with a first control section 41, a first environmental change specifying section 42, an imaging condition setting section 43 and a second control section 44.

The first control section 41 controls imaging of the still images, which constitute the time-lapse moving image, by the imaging section 3.

Concretely, the first control section 41 controls the imaging section 3 to image the still images under predetermined imaging conditions, at regular intervals, during a predetermined time period. Specifically, the first control section 41 reads out and obtains, from the imaging scene table 21, various imaging conditions corresponding to an intended image scene (e.g. "Sundown", etc.) specified on the basis of a predetermined operation in the operational input section 8 by a user, and controls the imaging section 3 to image the still images according to the various imaging conditions, under a predetermined exposure condition(s) (e.g. ISO speed, shutter speed, etc.), at regular interval times (e.g. "10 seconds", etc.), during the predetermined total time (corresponding to the predetermined time period; e.g. "60 minutes", etc.)

Incidentally, the exposure condition at the time of imaging the still images constituting the time-lapse moving image will be described later.

The first environmental change specifying section 42 specifies a change in the imaging environment at the time of imaging the still images.

Concretely, the first environmental change specifying section (specifying member) 42 specifies the change in the imaging environment when the imaging section 3 performs imaging. Specifically, the first environmental change specifying section 42 obtains the various imaging conditions from the imaging scene table 21, and specifies whether or not a presence or absence of the change in the imaging environment at the time of imaging the still images, with a length of the total time (the predetermined time period), from among the various imaging conditions, as a standard. For example, the first environmental change specifying section 42 judges whether or not the total time is longer than a predetermined time (e.g. "20 minutes", etc.), before starting imaging the still images.

The first environmental change specifying section 42 also obtains brightnesses of a predetermined number of still images taken by the imaging section 3, and specifies the change in the imaging environment on the basis of the obtained brightnesses.

For example, when imaging of the still images is started, the first environmental change specifying section 42 obtains, from the memory 2, a brightness (luminance value) of each of the predetermined number of still images taken by the imaging section 3 within the predetermined time period, and calculates a representative value (e.g. an average value, etc.) of the obtained brightnesses. Then, the first environmental change specifying section 42 judges whether or not the calculated representative value of the brightnesses has exceeded a predetermined threshold value (e.g. whether or not it has become darker so as to reach or exceed a certain level, etc.). When it is judged that the representative value has exceeded the predetermined threshold value, the first environmental change specifying section 42 specifies the fact that the imaging environment has changed.

Here, the first environmental change specifying section 42 may specify the change in the imaging environment, for example, by successively comparing the brightness representative values with each other, each of which is representative for the predetermined number of still images stored in the memory 3 in an imaging order, instead of comparing the representative value of the brightnesses of the predetermined number of still images with the threshold value. For example, the first environmental change specifying section 42 compares the representative value of the brightnesses of "$1^{st}$" to "$n^{th}$" still images with the representative value of the brightnesses of "$2^{nd}$" to "$n+1^{th}$" still images to judge whether or not the brightness has changed. The first environmental change specifying section 42 may repeat such judging process by performing increment (+1) so that the range of the predetermined number of still images, which becomes a comparison target, is shifted by one (1) image in the imaging order.

Incidentally, it is not necessary to use all of the still images taken by the imaging section 3 during the predetermined time period for specifying the change in the imaging environment. For example, it is possible to thin out the still images to be used, at a predetermined ratio, in view of a buffer amount of the memory 2 and the like.

Moreover, the first environmental change specifying section 42 specifies the change in the imaging environment when the imaging section 3 performs imaging according to new imaging conditions under the control of the second control section 44. Concretely, when the later-described imaging condition setting section 43 sets the new imaging conditions and then the imaging section 3 executes the imaging according to the new imaging conditions under the control of the second control section 44, the first environmental change specifying section 42 specifies the change in the imaging environment, for example, on the basis of the brightnesses of the predetermined number of still images which have been taken according to the new imaging conditions.

The imaging condition setting section 43 sets the imaging conditions.

Concretely, the imaging condition setting section 43 sets the various imaging conditions when the imaging section 3 performs the imaging under the control of the first control section 41, on the basis of the imaging scene table 21 recorded in the memory 2.

The imaging condition setting section (setting member) 43 also performs setting to determine whether or not the exposure condition should be fixed or subjected to tracking, depending on the change in the imaging environment specified by the first environmental change specifying section 42. Specifically, when the first environmental change specifying section 42 has judged that the total time is longer than the predetermined time, the imaging condition setting section 43 sets a tracking operation flag of the exposure condition to "ON". On the other hand, when the first environmental change specifying section 42 has judged that the total time is not longer than the predetermined time, the imaging condition setting section 43 sets the tracking operation flag of the exposure condition to "OFF". Thus, when the total time of the still images constituting the time-lapse moving image is longer than the predetermined time, the imaging condition setting section 43 executes the setting so that the exposure condition is subjected to tracking in conformity to the imaging environment, because there is a possibility that a lightness (imaging environment) around an apparatus body of the imaging apparatus 100 gradually changes with the lapse of time.

On the other hand, when the total time is not longer than the predetermined time, the imaging condition setting section 43 performs setting so that the exposure condition is fixed in conformity to the imaging environment. In this case, the first control section 41 controls the imaging section 3 to image the still images in the state that the once-set exposure condition is fixed, at the regular intervals, during the predetermined time period.

Here, fixing the exposure condition refers to unchanging the once-set exposure condition until the imaging ends, and tracking the exposure condition refers to grasping the imaging environment at each imaging timing and changing the exposure condition in conformity to the imaging environment as necessary.

Moreover, the imaging condition setting section 43 newly sets, for example, the exposure condition at the time of imaging the still images by the imaging section 3, after the imaging environment has changed.

Concretely, in the state that the tracking operation flag is set to "ON", namely, in the state that the exposure condition is subjected to tracking, the imaging condition setting section 43 sets new imaging condition so that a predetermined imaging condition changes only in a certain direction so as to follow the previously-changed imaging condition, in the imaging executed by the imaging section 3 under the control of the first control section 41, every time the first environmental change specifying section 42 specifies the change in the imaging environment. For example, once the exposure condition having a content (e.g. lowing a shutter speed, improving sensitivity of ISO speed, etc.) that makes the still images brighter is set, the imaging condition setting section 43 sets, after that time, the exposure condition so that it has a content that makes the still images brighter.

The second control section 44 controls the imaging of the time-lapse moving image by the imaging section 3, following the control by the first control section 41.

Concretely, the second control section 44 controls the imaging section 3 to perform the imaging according to the new imaging conditions set by the imaging condition setting section 43, following the imaging executed by the imaging section 3 under the control of the first control section 41. Specifically, when the first environmental change specifying section 42 has specified the fact that the imaging condition has changed, and when the imaging condition setting section 43 sets the new imaging conditions (e.g. the exposure condition, etc.), the second control section 44 continuously controls the imaging section 3 to image the still images according to the new imaging condition at the regular intervals.

Thus, the first control section 41 controls the imaging section 3 to image the still images constituting the time-lapse moving image according to the content of the imaging conditions set by the imaging condition setting section 43 before the imaging environment changes. The second control section 42 controls the imaging section 3 to image the still images constituting the time-lapse moving image according to the content of the new imaging conditions set by the imaging condition setting section 34 after the imaging environment has changed.

Here, each of the first control section 41 and the second control section 44 has a control member to control the imaging section 3 to image the still images, according to the content set by the imaging condition setting section 43, at the regular intervals during the predetermined time period.

The image processing section 5 appropriately performs a gain adjustment, for each color component of RGB, to the signal having an analog value of the frame image transferred from the electronic imaging section 32, then causes a sample hold circuit (not illustrated) to sample and hold the signal, causes an A/D convertor (not illustrated) to convert the signal into digital data, causes a color processing circuit (not illustrated) to perform a color adjusting process including pixel interpolating process and gamma (γ) correcting process, and then generates a luminance signal Y and color difference signals Cb, Cr (YUV data) which have digital values.

The luminance signal Y and color difference signals Cb, Cr output from the color processing circuit are transferred by Direct Memory Access (DMA) to the memory 2 used as a buffer memory through a not-illustrated DMA controller.

The recording medium control section 6 is configured so that the recording medium M is attachable/detachable to/from the recording medium control section 6, and controls reading of data from the attached recording medium M and writing of data to the recording medium M.

Specifically, the recording medium control section (moving image generating member) 6 treats each of the still images taken by the imaging section 3 as the frame image, and correlates them to one another to record them in the recording medium M. These frame images constitute the time-lapse moving image which is reproduced at time intervals different from the interval times (the regular intervals).

Incidentally, the recording medium M is composed of a non-volatile memory (flash memory) or the like, but this is a mere example and the present invention is not limited thereto. It can be arbitrarily changed as someone thinks proper.

The display section 7 is equipped with a display panel 71 and a display control section 72.

The display panel 71 displays the image within a display screen. The display panel 71 includes, for example, a liquid crystal display panel and an organic EL display panel, but they are mere examples and the present invention is not limited thereto.

The display control section 72 reads out the image data for display temporarily stored in the memory 2, and performs controlling so that a predetermined image is displayed on the display screen of the display panel 71 on the basis of the image data having a predetermined size which has been decoded by the image processing section 5. Specifically, the display control section 72 includes a Video Random Access Memory (VRAM), a VRAM controller, a digital video encoder, etc., which are not illustrated. The digital video encoder reads out the luminance signal Y and color difference signals Cb, Cr, which have been encoded by the image processing section 5 and stored in the VRAM, from the VRAM through the VRAM controller, at a predetermined reproducing frame rate (e.g. 30 fps), and generates video signals on the basis of these pieces of data to output the video signal to the display panel 71.

The operational input section 8 is used for executing predetermined operations of the imaging apparatus 100. Specifically, the operational input section 8 is equipped with an operation section including a shutter button relating to an instruction to image an object, a selection determining button relating to selection/instruction of an imaging mode, functions, etc., a zoom button relating to adjustment instruction of a zoom amount, which buttons are not illustrated, and so on, and outputs a predetermined operation signal to the central control section 1 depending on the operation in each button of the operation section.

<Imaging Process>

Next, the imaging process executed by the imaging apparatus 100 will be described with reference to FIG. 3.

Figure 3:
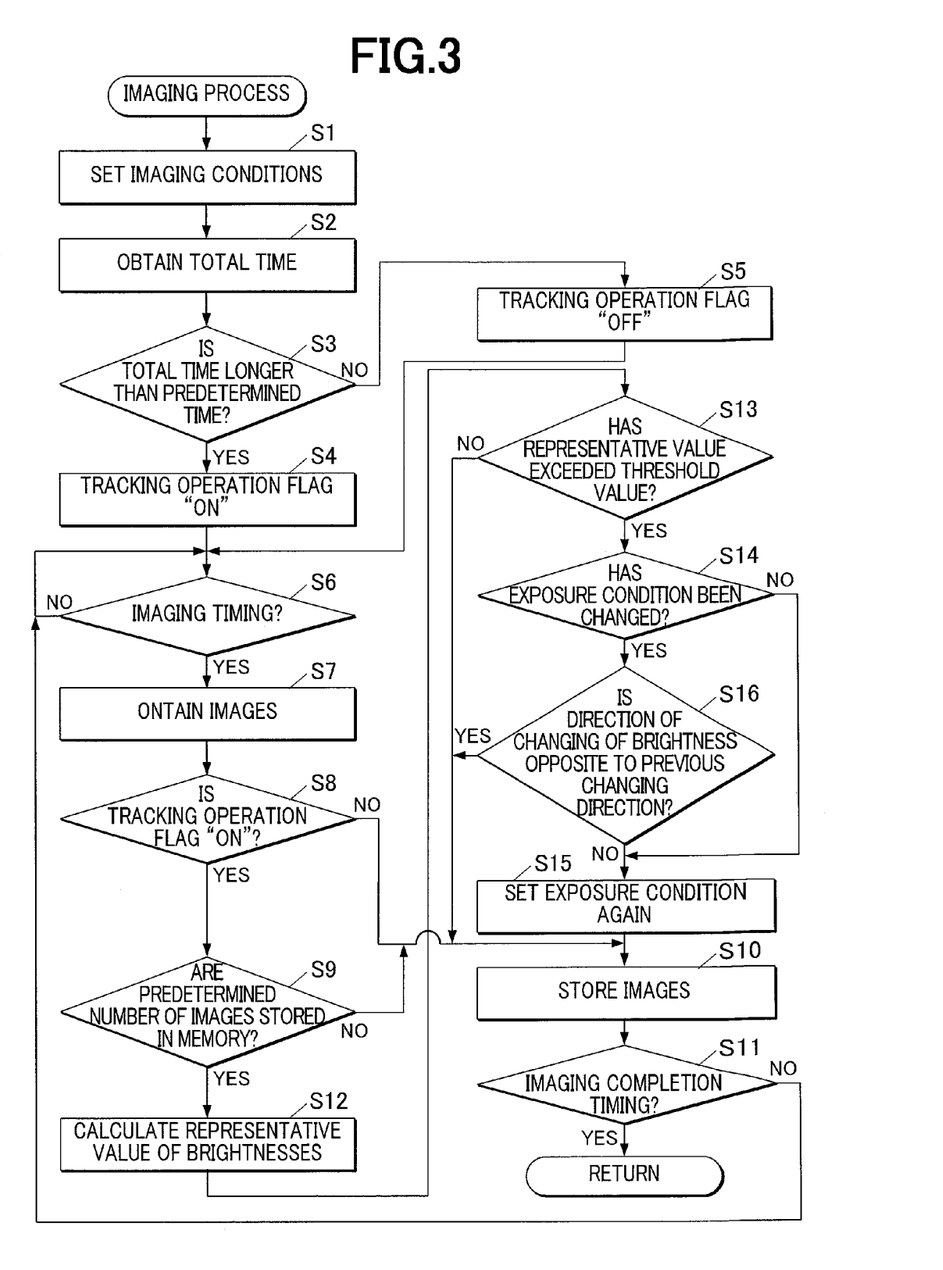
FIG. 3 is a flowchart illustrating an example of an operation relating to the imaging process by the imaging apparatus illustrated in FIG. 1.

FIG. 3 is a flowchart illustrating an example of an operation relating to the imaging process.

The imaging process is performed by the respective sections of the imaging apparatus 100 under the control of the central control section 1 when a mode for imaging the time-lapse moving image is selected/instructed from among a plurality of operation modes displayed on a menu screen on the basis of a predetermined operation in the selection determining button of the operational input section 8 by a user.

As illustrated in FIG. 3, the imaging condition setting section 43 reads out and sets, from the imaging scene table 21 in the memory 2, the various imaging conditions corresponding to the intended imaging scene (e.g. "Sundown", etc.) specified on the basis of the predetermined operation in the operational input section 8 by a user (Step S1).

Then, the first environmental change specifying section 42 obtains the total time (e.g. "60 minutes", etc.) from the set imaging conditions (Step S2), and judges whether or not the total time is longer than the predetermined time (e.g. "20 minutes", etc.) (Step S3).

When it is judged that the total time is longer than the predetermined time (Step S3; YES), the imaging condition setting section 43 sets the tracking operation flag of the exposure condition to "ON" (Step S4). On the other hand, when it is judged that the total time is not longer than the predetermined time (Step S3; NO), the imaging condition setting section 43 sets the tracking operation flag of the exposure condition to "OFF" (Step S5).

Next, the first control section 41 judges whether or not the timing to image an object has come on the basis of the set imaging conditions (Step S6).

Here, when it is judged that the timing to image an object has not come (Step S6; NO), the first control section 41 repeatedly executes the judging process to judge whether or not the timing to image an object has come, at predetermined time intervals.

When it is judged that the timing to image an object has come in Step S6 (Step S6; YES), the first control section 41 controls the imaging section 3 to image the object, and the image processing section 5 generates and obtains the image data (YUV data) of the still images of the object (Step S7).

Then, the image processing section 5 transfers the image data of the still images to the memory 2 which is used as the buffer memory.

Subsequently, the first environmental change specifying section 42 judges whether or not the tracking operation flag is "ON" (Step S8).

When it is judged that the tracking operation flag is "ON" in Step S8 (Step S8; YES), the first environmental change specifying section 42 judges whether or not the predetermined number of still images, which correspond to the predetermined time, are temporarily stored in the memory 2 (Step S9).

Here, when it is judged that the predetermined number of still images are not stored (Step S9; No), the recording medium control section 6 obtains the image data of the still images, which has been stored in the memory 2 immediately before that time, to store the obtained image data in the recording medium M (Step S10).

Also in the case that it is judged that the tracking operation flag is not "ON", namely, the tracking operation flag is "OFF" (Step S8; NO), the processing shifts to Step S10, and the recording medium control section 6 obtains the image data of the still images, stored in the memory 2 immediately before that time, to record the obtained image data in the recording medium M (Step S10).

At that time, the recording medium control section 6 correlates the pieces of image data of the still images to be stored in the recording medium M to one another, as the frame images constituting the time-lapse moving image, and successively records these pieces of image data. Incidentally, the processing to correlate the pieces of image data of still images to one another as the frame images and store these pieces of image data is performed every time the recording medium control section 6 records the image data of still images in the recording medium M, but the description thereof will be omitted hereinafter.

Then, the first control section 41 judges whether or not the timing to terminate the imaging of the object has come (Step S11). Concretely, the first control section 41 judges whether or not the imaging during the total time set by the imaging conditions has ended and the timing to terminate the imaging of the object has come.

Here, when it is judged that the timing to terminate the imaging of the object has not come (Step S11; NO), the processing returns to Step S6, and the first control section 41 judges whether or not the timing to image an object has come (Step S6).

The processes subsequent to Step S6 are repeatedly executed until it is judged that the predetermined number of still images have been stored in Step S9 (Step S9; YES).

When it is judged that the predetermined number of still images have been stored in Step S9 (Step S9; YES), the first environmental change specifying section 42 obtains the respective brightnesses (luminance values) of the predetermined number of still images from the memory 2, and calculate the representative value (e.g. the average value, etc.) of the obtained brightnesses (Step S12). Subsequently, the first environmental change specifying section 42 judges whether or not the calculated representative value of the brightnesses exceeds the predetermined threshold value, for example, judges whether or not the still images become darker (Step S13). In other words, the first environmental change specifying section 42 judges whether or not the lightness around the apparatus body changes so as to reach or exceed a predetermined lightness.

When it is judged, in Step S13, that the representative value of the brightnesses exceeds the predetermined threshold value, for example, that the still images becomes darker (Step S13; YES), the imaging condition setting section 43 judges whether or not the exposure condition has been previously changed in the imaging process (Step S14).

Here, when it is judged that the exposure condition has not been changed (Step S14; NO), the imaging condition setting section 43 sets the exposure condition of the imaging section 3 after the change in the imaging environment, again (Step S15). After that, the processing shifts to Step S10, and the recording medium control section 6 obtains the image data of still images stored in the memory 2 immediately before that time, and records the image data in the recording medium M (Step S10).

Also in the case that it is judged that the representative value of the brightnesses does not exceed the predetermined threshold value in Step S13 (Step S13; NO), the processing shifts to Step 10, and the recording medium control section 6 obtains the image data of still images previously stored in the memory 2, and records the image data in the recording medium M (Step S10).

When the exposure condition has been set again in Step S15, the second control section 44 controls the imaging section 3 to execute the imaging according to the newly-set exposure condition, following the control of the first control section 41.

Then, when it is judged that the exposure condition has been changed in Step S14 (Step S14; YES), the imaging condition setting section 43 judges whether or not the direction of the change of the representative value of the brightnesses is opposite to the previous changing direction (Step S16). Concretely, for example, in the case that the representative value of the brightnesses has previously changed so as to become darker, the imaging condition setting section 43 judges whether or not the representative value of the brightnesses is currently changing so as to become brighter.

Here, when it is judged that the changing direction of the brightness is not opposite to the previous changing direction (Step S16; NO), the processing shifts to Step S15, and the imaging condition setting section 43 sets the new exposure condition so that the current exposure condition changes only in the certain direction (Step S15). For example, in the case that the exposure condition having the content (e.g. lowing the shutter speed, improving the sensitivity of the ISO speed, etc.) that makes the still images brighter is set as the new imaging conditions, the imaging condition setting section 43 sets the exposure condition having the content that makes the still images brighter, again.

After that, the processing shifts to Step S10, and the recording medium control section 6 obtains the image data of still images stored in the memory 2 immediately before that time, and records the image data in the recording medium M (Step S10).

On the other hand, when it is judged in Step S16 that the changing direction of the brightness is opposite to the previous changing direction (Step S16; YES), the process of Step S15 is skipped, and in Step S10, the recording medium control section 6 obtains the image data of still images stored in the memory 2 immediately before that time, and records the image data in the recording medium M (Step S10).

Then, in Step S11, the second control section 44 judges whether or not the timing to terminate the imaging of the object has come (Step S11).

Here, when it is judged that the timing to terminate the imaging of the object has not come (Step S11; NO), the processing returns to Step S6, and the second control section 44 judges whether or not the timing to image an object has come (Step S6).

The above processes are repeatedly executed until it is judged that the timing to terminate the imaging of the object has come in Step S11 (Step S11; YES).

When it is judged that the timing to terminate the imaging of the object has come in Step S11 (Step S11; YES), the imaging process ends.

As described above, the imaging apparatus 100 of the first embodiment specifies the change in the imaging environment, performs setting to determine whether the exposure condition is to be fixed or subjected to tracking depending on the specified change in the imaging environment, and controls the imaging section 3 to image the still images according to the set content, at regular intervals, during the predetermined time period. Accordingly, even if the imaging environment changes in the middle of the imaging of the still images constituting the time-lapse moving image, the imaging of the still images can be continuously performed according to the new exposure condition based on the change in the imaging environment. Concretely, for example, in the case of imaging the plural still images during the predetermined time period (total time), by newly setting the exposure condition depending on the lightness around the apparatus body to continue the imaging, the whole screen of each frame image (still image) can be prevented from being displayed while including blown out highlights and/or blocked up shadows when the time-lapse moving image is reproduced.

Therefore, it becomes possible to image the still image that hardly poses a problem for viewing by a user even if the imaging environment changes at the time of imaging the still images constituting the time-lapse moving image.

Moreover, the change in the imaging environment is specified when the imaging section 3 performs the imaging according to the new imaging conditions under the control of the second control section 44. Accordingly, the imaging conditions can be set again depending on the changed imaging environment, even if the new imaging conditions are tentatively set, for example, when the total time becomes long and the imaging environment changes again. Especially, in the case of the exposure condition is subjected to tracking, the new imaging condition is set so that the predetermined imaging condition changes only in the certain direction. Therefore, the direction of the change of the newly-set imaging condition becomes only the certain direction, and it becomes possible to image the still image that hardly poses a problem for viewing by a user, even if the imaging conditions are set again depending on the changed imaging environment.

Moreover, because whether or not a presence or absence of the change in the imaging environment is specified with the length of the total time as a standard, it is possible to previously specify a presence or absence of the change in the imaging environment prior to the imaging of the still images constituting the time-lapse moving image. Furthermore, because the brightnesses of the predetermined number of still images taken by the imaging section 3 are obtained and the change in the imaging environment is specified on the basis of the obtained brightnesses, it is possible to specify the change in the imaging environment (lightness around the apparatus body) from the brightnesses of the actually-imaged still images. Especially, by using the representative value of the brightnesses of the predetermined number of still images, the influence on the still images can be reduced, for example, even if there is a still image whose brightness has drastically changed due to a moving body having crossed an angle of view. Thus, the change in the imaging environment (lightness around the apparatus body) can be appropriately specified.

[Second Embodiment]

Hereafter, an imaging apparatus 200 according to the second embodiment will be described with reference to FIG. 4 and FIG. 5.

The imaging apparatus 200 of the second embodiment has substantially the same configuration as that of the imaging apparatus 100 of the first embodiment, except the points to be described in detail below, so the detailed descriptions thereof are omitted.

Figure 4:
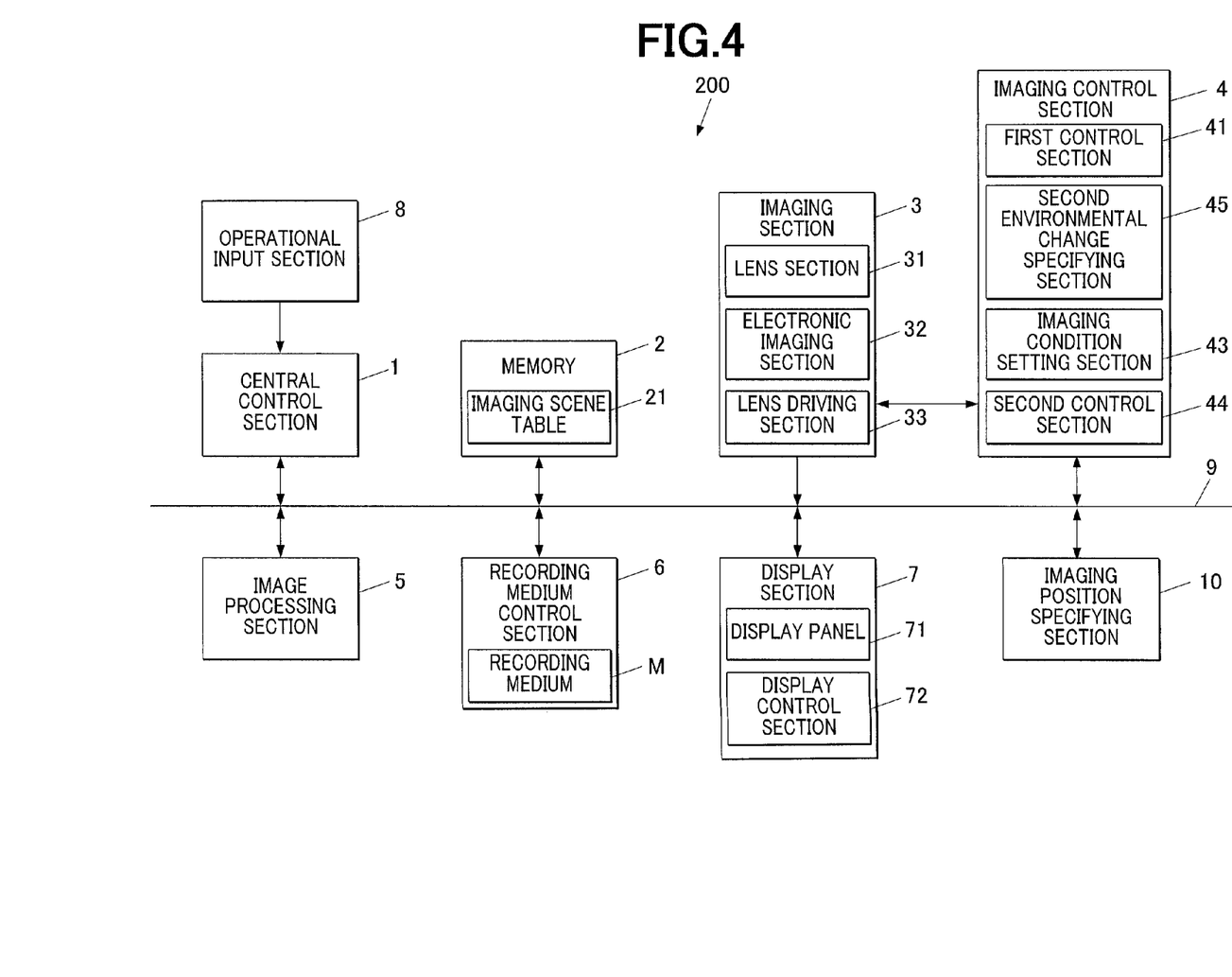
FIG. 4 is a block diagram illustrating a schematic configuration of an imaging apparatus according to a second embodiment to which the present invention is applied.

FIG. 4 is a block diagram illustrating a schematic configuration of the imaging apparatus 200 of the second embodiment to which the present invention is applied.

As illustrated in FIG. 4, the imaging apparatus 200 of this embodiment includes an imaging position specifying section 10, in addition to the central control section 1, the memory 2, the imaging section 3, the imaging control section 4, the image processing section 5, the recording medium control section 6, the display section 7 and the operational input section 8.

The imaging position specifying section 10 performs positioning of the imaging position at which an apparatus body of the imaging apparatus 200 exists.

Concretely, the imaging position specifying section 10 is configured to include, for example, a Global Positioning System (GPS) processing section, which receives signals transmitted from a GPS satellite to measure the imaging position at which the apparatus body exists, and so on.

Specifically, for example, the imaging position specifying section 10 receives GPS signals (e.g. Almanac (approximate orbital information), Ephemeris (detailed orbital information), etc.), which are transmitted from a plurality of GPS satellites (not illustrated) launched into a low-earth orbit, with a receiving antenna at a predetermined timing, and generates GPS information. Then, the imaging position specifying section 10 executes predetermined positioning calculations on the basis of the generated GPS information to measure an absolute three-dimensional current position (latitude, longitude and altitude) of the apparatus body, and thus generates positional information (e.g. coordinate information of latitude, longitude and altitude) relating to the measured position (GPS positioning).

The imaging control section 4 is equipped with a second environmental change specifying section 45 instead of the first environmental change specifying section 42.

The second environmental change specifying section 45 specifies a presence or absence of the change in the imaging environment, with the position at which the apparatus body exists, and a period of time (hours) for imaging by the imaging section 3, as standards. Concretely, the imaging control section 4 judges whether or not the lightness (imaging environment) around the apparatus body is likely to change depending on duration of sunshine in the case that the imaging is continued during a predetermined time period after the current time at the imaging position, when a predetermined imaging scene (e.g. "Night Scene", "Sundown", etc.) is specified on the basis of a predetermined operation in the operational input section 8 by a user.

Specifically, for example, the second environmental change specifying section 45 obtains the positional information of the imaging position, at which the apparatus body exists, specified by the imaging position specifying section 10, and obtains information relating to the period of time for imaging based on the current time. Then, the second environmental change specifying section 45 judges whether or not the lightness around the apparatus body is likely to gradually change as time passes when the imaging is continued during the predetermined time period after the current time at the imaging position, on the basis of the obtained positional information of the imaging position and the obtained period of time for imaging.

When it is judged that the lightness around the apparatus body is likely to gradually change as a result of judgment by the second environmental change specifying section 45, the imaging condition setting section 43 sets the tracking operation flag of the exposure condition to "ON". On the other hand, when it is judged that lightness around the apparatus body is not likely to gradually change, the imaging condition setting section 43 sets the tracking operation flag of the exposure condition to "OFF".

Incidentally, there may be adopted, for example, a configuration where a table (not illustrated) in which the positional information is correlated to time information such as sunrise and sunset is previously recorded in a predetermined recording member (e.g. memory 2, etc.) of the imaging apparatus 200, and the second environmental change specifying section 45 refers to the table to judge whether or not the lightness (imaging environment) around the apparatus body is likely to change when the imaging is continued during the predetermined time period after the current time at a predetermined imaging position.

Moreover, the second environmental change specifying section 45 obtains the brightnesses of the predetermined number of still images taken by the imaging section 3 to specify the change in the imaging environment on the basis of the obtained brightnesses, similarly to the case of the first environmental change specifying section 42.

Furthermore, the second environmental change specifying section 45 specifies the change in the imaging environment when the imaging section 3 executes the imaging according to the new imaging conditions under the control of the second control section 44.

<Imaging Process>

Next, the imaging process by the imaging apparatus 200 will be described with reference to FIG. 5.

Figure 5:
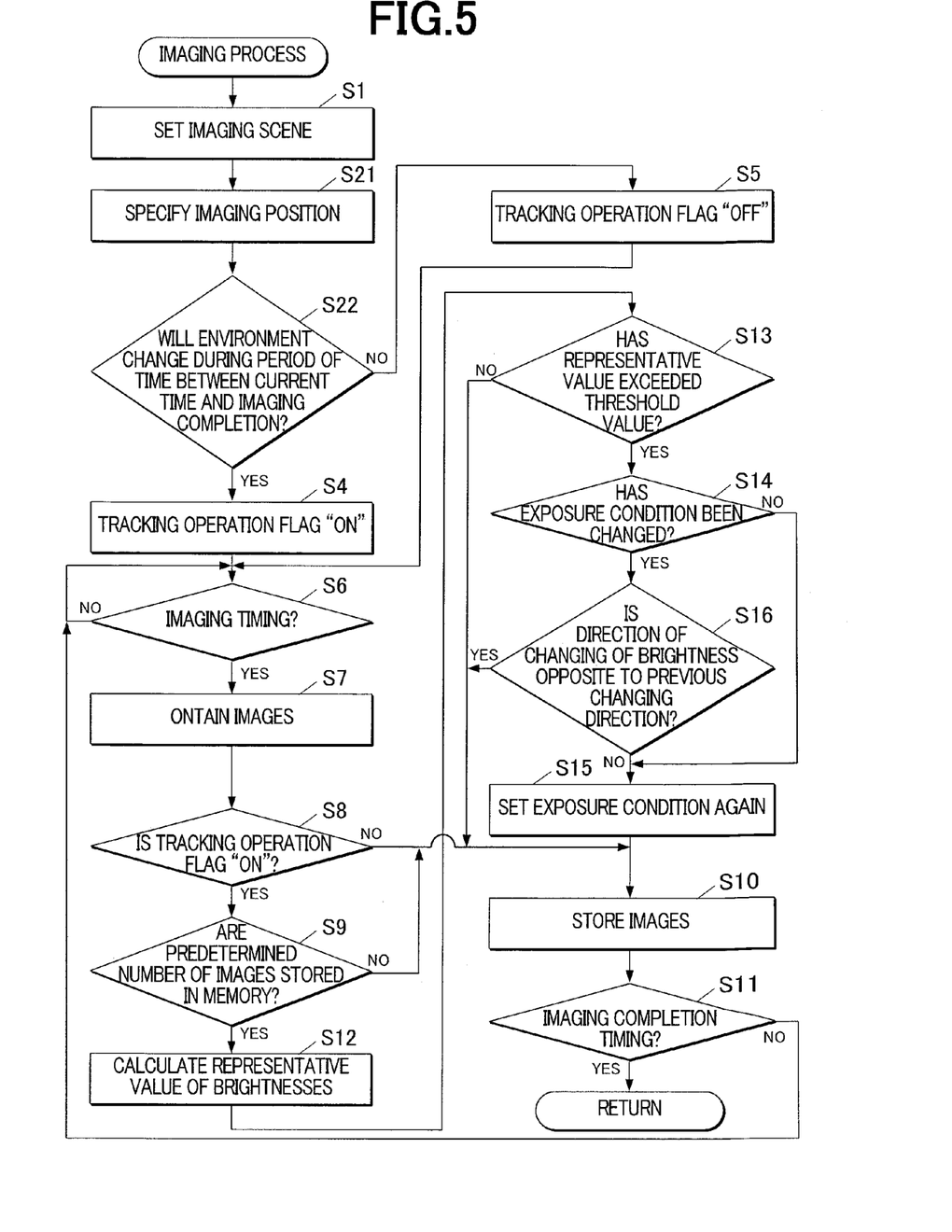
FIG. 5 is a flowchart illustrating an example of an operation relating to the imaging process by the imaging apparatus illustrated in FIG. 4.

FIG. 5 is a flowchart illustrating an example of an operation relating to the imaging process.

Incidentally, the imaging process by the imaging apparatus 200 of the second embodiment is approximately same as the imaging process by the imaging apparatus 100 of the first embodiment, except the points to be described in detail below, so the detailed descriptions thereof are omitted.

As illustrated in FIG. 5, the imaging condition setting section 43 reads out and sets the various imaging conditions corresponding to the intended imaging scene (e.g. "Sundown", etc.) specified on the basis of the predetermined operation in the operational input section 8 by a user, from the imaging scene table 21 of the memory 2 (Step S1).

Then, the imaging position specifying section 10 specifies the imaging position at which the apparatus body exists, for example, by GPS positioning, to generate the positional information (Step S21). Subsequently, the second environmental change specifying section 45 obtains the total time from among the set imaging conditions, and judges whether or not the imaging environment will change during a period of time between the current time and the completion of imaging (Step S22). Specifically, the second environmental change specifying section 45 obtains the positional information of the imaging position, at which the apparatus body exists, specified by the imaging position specifying section 10, obtains the information relating to the period of time for imaging, to which the current time is related, and judges whether or not the lightness around the apparatus body is likely to gradually change as time passes when the imaging is continued during the predetermined time period after the current time at the imaging position.

Incidentally, the processes of Step S21 and Step S22 may be executed only when the imaging scene intended by a user is the predetermined imaging scene (e.g. "Night Scene", "Sundown", etc.) in Step S1.

When it is judged that the imaging environment will change during the period of time between the current time and the completion of imaging in Step S22 (Step S22; YES), the imaging condition setting section 43 sets the tracking operation flag of the exposure condition to "ON" (Step S4). On the other hand, when it is judged that the imaging environment will not change during the period of time between the current time and the completion of imaging (Step S22; NO), the imaging condition setting section 43 sets the tracking operation flag of the exposure condition to "OFF" (Step S5).

After that, the processing shifts to Step S6, and the subsequent process are performed. Incidentally, the processes subsequent to Step S6 are substantially same as those in the imaging process of the first embodiment. So only the operation of the second environmental change specifying section 45 will be described.

Concretely, in Step S8, the second environmental change specifying section 45 judges whether or not the tracking operation flag is "ON" (Step S8). When it is judged that the tracking operation flag is "ON" in Step S8 (Step S8; YES), the second environmental change specifying section 45 judges whether or not the predetermined number of still images are temporarily stored in the memory 2 (Step S9).

When it is judged that the predetermined number of still images are temporarily stored in the memory 2 in Step S9 (Step S9; YES), the second environmental change specifying section 45 obtains the brightnesses (luminance values) of the predetermined number of still images from the memory 2, and calculates the representative value (e.g. the average value, etc.) of the obtained brightnesses (Step S12). Subsequently, the second environmental change specifying section 45 judges the calculated representative value of the brightnesses exceeds the predetermined threshold value (Step S13).

As described above, the imaging apparatus 200 of the second embodiment can continuously execute the imaging of the still images according to the new imaging conditions based on the change in the imaging environment even when the imaging environment changes in the middle of the imaging of the still images constituting the time-lapse moving image, similarly to the imaging apparatus 100 of the first embodiment. Thus, it is possible to image the still images that hardly pose a problem for viewing by a user.

Moreover, because the presence or absence of the change in the imaging environment is specified by using the position at which the apparatus body exists and the period of time (hours) for imaging as standards, it is possible to previously specify the presence or absence of the change in the imaging environment prior to the imaging of the still images constituting the time-lapse moving image.

Incidentally, the present invention is not limited to the first and second embodiments, and various modification and design changes may be added thereto without departing from the spirit of the present invention.

For example, though the first and second embodiments describe the case that the exposure condition is newly set as the imaging condition, there may also be adopted, for example, a configuration where a while balance and/or focus position is newly set.

Moreover, in the first and second embodiments, the presence or absence of the change in the imaging environment is previously specified prior to the imaging of the still images constituting the time-lapse moving image, but it is a mere example. The present invention is not limited thereto, and do not need to always execute such processing. All it needs is having a configuration to specify whether or not the imaging environment has actually changed at the time of imaging of the predetermined number of the still images.

Furthermore, in the first and second embodiments, once the exposure condition having the content that makes the still images brighter (or darker) is set, the imaging condition setting section 43 executes setting, since then, so that also the newly-set exposure condition has the content that makes the still images brighter (or darker). However, it is a mere example and the present invention is not limited thereto. For example, in the case that the exposure condition having the content that makes the still images brighter (or darker) is set once, the imaging condition setting section 43 may execute subsequent imaging of the still images while fixing the set exposure condition.

Moreover, in the first and second embodiments, the imaging condition setting section 43 performs setting of "ON" or "OFF" of the tracking operation flag, but it is a mere example. The present invention is not limited thereto, and may be appropriately changed as someone thinks proper. For example, such setting may be executed by the first environmental change specifying section 42 or the second environmental change specifying section 45.

Furthermore, in the first and second embodiments, each of the first control section 41 and the second control section 44 takes charge of part of the imaging control of the still images constituting the time-lapse moving image, before and after the change of the exposure condition, but it is a mere example and the present invention is not limited thereto. For example, there may be also adopted a configuration where one (1) control section (control member) executes all the control through a period of the change of the exposure condition.

The configurations of the imaging apparatuses 100, 200 illustrated in the first and second embodiments are mere examples, and the present invention is not limited thereto.

Additionally, the first and second embodiment describe the configuration where the functions as the specifying member, the setting member and the control member are implemented by driving the first environmental change specifying section 42 (the second environmental change specifying section 45), the imaging condition setting section 43, the first control section 41 and the second control section 44 under the control of the central control section 1, but the present invention is not limited thereto. The above functions may be implemented by executing the predetermined programs or the like by the central control section 1.

Concretely, it is possible to cause a program memory (not illustrated) to previously record programs including a specifying process routine, a setting process routine and a controlling process routine. The CPU of the central control section 1 may function as a member to specify the change in the imaging environment when the imaging section 3 performs imaging according to the specifying process routine. The CPU of the central control section 1 may also function as a member to execute setting to determine whether the exposure condition is to be fixed or subjected to tracking depending on the specified change of the imaging environment according to the setting process routine. The CPU of the central control section 1 may also function as a member to execute controlling so that the still images are imaged according to the set content, at regular intervals, during the predetermined time period, according to the controlling process routine.

Similarly, also the moving image generating member can be implemented by executing the predetermined programs by the CPU of the central control section 1.

Moreover, as a computer readable medium storing programs for executing the above processes, there can be used a ROM, a hard disk, a non-volatile memory such as a flash memory and a portable recording medium such as a CD-ROM. As a medium for providing data of the programs via a predetermined communication line, also carrier wave can be adopted.

Although some embodiments of the present invention are described above, the scope of the present invention is not limited to the above embodiment and includes the scope of the invention of the claims and the scope of equivalents thereof.

What is claimed is:

1. An imaging apparatus comprising:
an imaging member comprising an image sensor; and
a processor which is configured to:
determine whether or not an imaging total time which is set in advance is longer than a predetermined time when the imaging member performs imaging repeatedly at regular intervals during the imaging total time;
perform a setting so that an exposure condition is to be subjected to tracking, when it is determined that the total imaging time is longer than the predetermined time; and
control the imaging member to perform imaging repeatedly at the regular intervals during the imaging total time according to the set exposure condition.

2. The imaging apparatus according to claim 1, wherein when the processor has performed the setting so that the exposure condition is to be subjected to tracking, the processor performs the setting so that the exposure condition changes only in a certain direction.

3. The imaging apparatus according to claim 1 wherein the processor is further configured to generate a moving image which includes, as a frame, a still image from among images obtained by the imaging member performing imaging repeatedly at the regular intervals, and is reproduced at a time interval different from the regular interval.

4. The imaging apparatus according to claim 1,
wherein the processor is further configured to determine whether or not a brightness of a predetermined number of still images captured by the imaging member changes, and
wherein the processor performs a setting so that the exposure condition is to be subjected to tracking, when it is determined that the brightness changes.

5. An imaging method for an imaging apparatus comprising an imaging member including an image sensor, the method comprising:
imaging with the imaging member;
determining whether or not an imaging total time which is set in advance is longer than a predetermined time when imaging is performed by the imaging member repeatedly at regular intervals during the imaging total time;
performing a setting so that an exposure condition is to be subjected to tracking, when it is determined that the total imaging time is longer than the predetermined time; and
performing control so that imaging is performed repeatedly by the imaging member at the regular intervals during the imaging total time according to the set exposure condition.

6. A non-transitory computer readable recording medium having recorded thereon a program that is executable by a computer of an imaging apparatus including an imaging member comprising an image sensor, the program being executable by the computer to perform functions comprising:
determining whether or not an imaging total time which is set in advance is longer than a predetermined time when imaging is performed by the imaging member repeatedly at regular intervals during the imaging total time;
performing a setting so that an exposure condition is to be subjected to tracking, when it is determined that the total imaging time is longer than the predetermined time; and
performing control so that imaging is performed repeatedly by the imaging member at the regular intervals during the imaging total time according to the set exposure condition.

7. An imaging apparatus comprising:
an imaging member comprising an image sensor; and
a processor which is configured to:
determine an imaging position at which an apparatus body of the imaging apparatus exists and to determine whether or not an imaging total time from an imaging start time is longer than a predetermined time;
perform a setting so that an exposure condition is to be subjected to tracking, when it is determined that the total imaging time from the imaging start time at the imaging position is longer than the predetermined time;

control the imaging member to perform imaging repeatedly at regular intervals during the imaging total time according to the set exposure condition.

8. The imaging apparatus according to claim 7, wherein when the processor has performed the setting so that the exposure condition is to be subjected to tracking, the processor performs the setting so that the exposure condition changes only in a certain direction.

9. The imaging apparatus according to claim 7, wherein the processor is further configured to generate a moving image which includes, as a frame, a still image from among images obtained by the imaging member performing imaging repeatedly at the regular intervals, and is reproduced at a time interval different from the regular interval.

10. An imaging method for an imaging apparatus comprising an imaging member including an image sensor, the method comprising:
   imaging with the imaging member;
   determining an imaging position at which an apparatus body of the imaging apparatus exists and determining whether or not an imaging total time from an imaging start time is longer than a predetermined time;
   performing a setting so that an exposure condition is to be subjected to tracking, when it is determined that the total imaging time from the imaging start time at the imaging position is longer than the predetermined time; and
   performing control so that imaging by the imaging member is performed repeatedly at regular intervals during the imaging total time according to the set exposure condition.

11. A non-transitory computer readable recording medium having recorded thereon a program that is executable by a computer of an imaging apparatus comprising an imaging member including an image sensor, the program being executable by the computer to cause the computer to perform functions comprising:
   determining an imaging position at which an apparatus body of the imaging apparatus exists and determining whether or not an imaging total time from an imaging start time is longer than a predetermined time;
   perform a setting so that an exposure condition is to be subjected to tracking, when it is determined that the total imaging time from the imaging start time at the imaging position is longer than the predetermined time;
   performing control so that imaging by the imaging member is performed repeatedly at regular intervals during the imaging total time according to the set exposure condition.

* * * * *